Sept. 13, 1960 F. K. BRUNTON 2,952,125

FIRE PROTECTIVE SYSTEM FOR JET ENGINES

Filed Feb. 17, 1959

INVENTOR.
FREDERIC K. BRUNTON
BY
Reynolds, Beach & Christensen
ATTORNEYS

United States Patent Office 2,952,125

Patented Sept. 13, 1960

1

2,952,125

FIRE PROTECTIVE SYSTEM FOR JET ENGINES

Frederic K. Brunton, Bellevue, Wash., assignor to Boeing Airplane Company, Seattle, Wash., a corporation of Delaware Filed Feb. 17, 1959, Ser. No. 793,832

10 Claims. (Cl. 60—39.09)

Following crashes of jet-engined aircraft, fires have started as fuel-vapor-laden ambient air is pulled through jet engines that are still spinning and hot, or as air alone is pulled through, picking up fuel vapors still discharging into the engine, to mix with such air. There are protective systems to guard against such hazards, but up to now those known to me have included self-contained water-release units. These are effective, but they require more space and involve a larger weight penalty than is desirable. For example, in a commercial type four engine jet airliner, such water release units would involve a weight penalty of approximately one thousand pounds, or half a ton.

It is the purpose of the present invention to provide a fire protective device or system for use under such conditions, which is light in weight, requires but little space, and which it is expected will be fully as effective as the water-release systems referred to above. Moreover, such a device as is contemplated by the present invention can be arranged for automatic operation by inertia means or impact-actuated means or, of course, may be manually operable by the pilot in advance of an impending crash. The present invention will operate by blocking passage of vapor-laden air or of air alone through the engine, and hence will prevent its admixture therein with fuel vapors or contact thereof with hot elements of the engine.

In the accompanying drawings, the invention is shown embodied in a typical construction, the same incorporating various refinements and additions, some or all of which may not be necessary in a particular installation.

Figure 1:
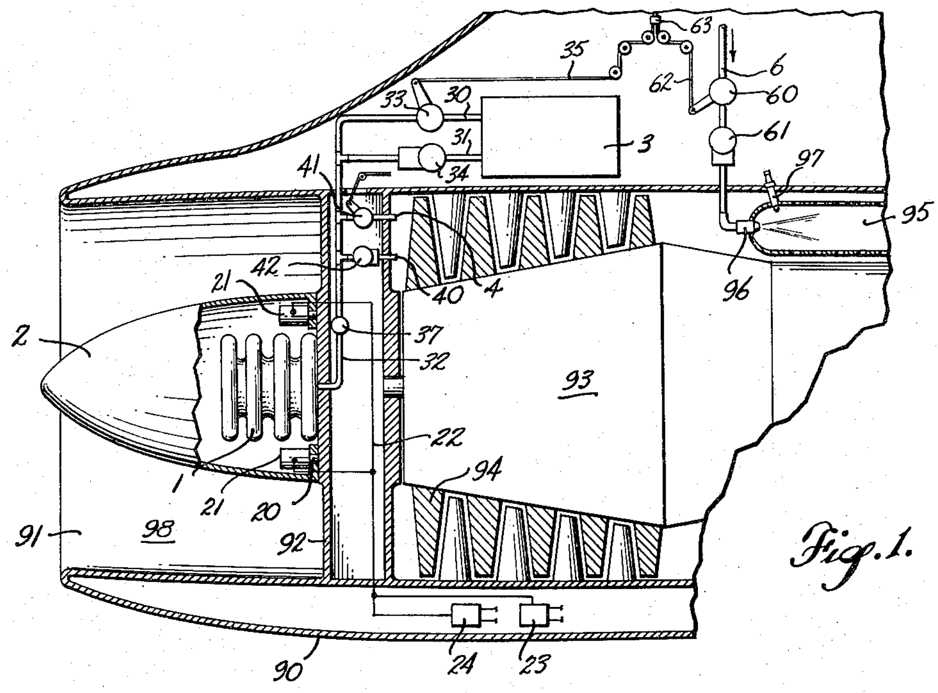
Figure 2:
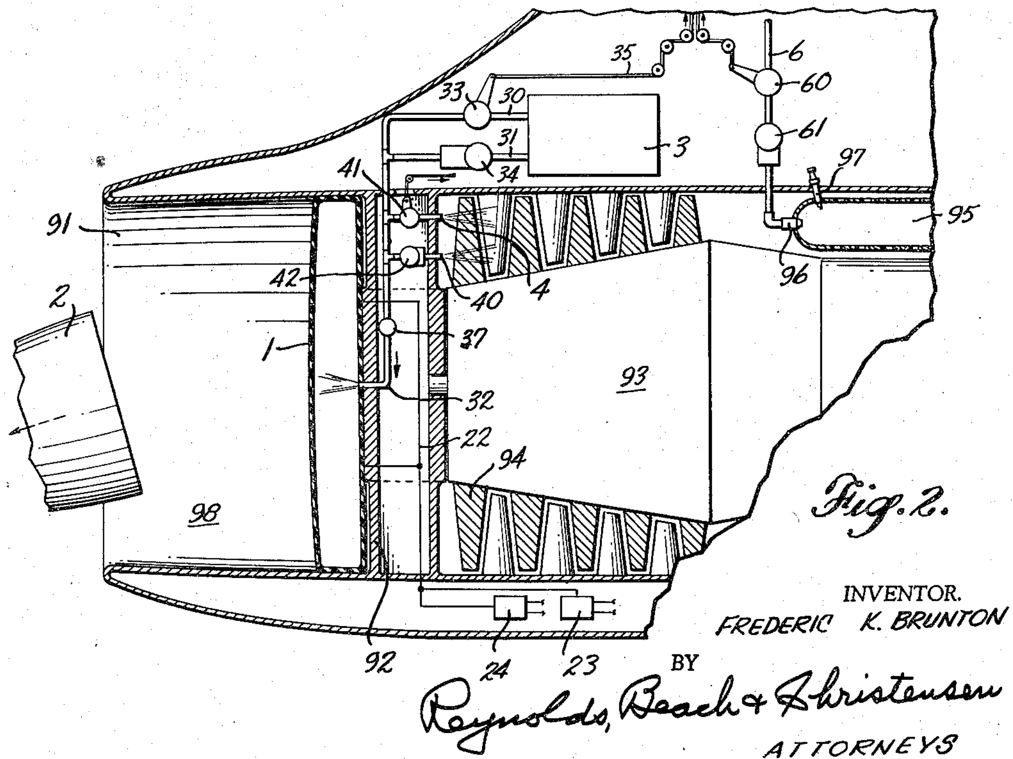

Figure 1 is a diagrammatic axial sectional view of the forward portion of a jet engine as it might be arranged for normal flight, incorporating the present invention, and Figure 2 is a similar view but illustrating the fire protective system in operative condition.

The engine shown is intended to be typical of various forms that might be thus protected. It includes an engine 90 open at 91 at its forward end for intake of air, the air then passing through a passageway 98 and between spaced radial vanes or struts 92 and entering a compressor section, in which a rotor 93 having blades 94 is located. After being compressed in the compressor section, the air is delivered to a combustion section which is typified in the drawings by the combustion chamber 95 into which fuel is delivered by way of the fuel nozzle 96 for admixture with the compressed air and ignition by the igniter 97, and resultant combustion of the fuel. The hot gases are then ejected rearwardly through the normal jet nozzles, not shown.

In crashes of jet-powered aircraft it has been found that fuel vapors arise from ruptured fuel tanks, and mix with ambient air to form a combustible gas. If the jet engine compressor 93 continues to spin this mixture is indrawn at the air intake opening 91 and comes into contact with hot surfaces at 95, where it ignites. Delayed fires have been thus initiated, although no fire

2 accompanied the crash. In other cases fuel may continue to be delivered by nozzles 96 to the combustion chambers 95 of a crashed jet engine, and air uncontaminated by fuel vapor will be drawn in at the intake 91 by the still spinning engine, and will form a combustible mixture and ignite within the engine. In either case it is the continued admission through the intake 91 that constitutes the greatest danger.

According to the present invention, a lightweight, inflatable, collapsible cell 1, which might be for instance a bag of rubber composition material, is mounted within the air intake passageway but preferably at a location ahead of the compressor 93, 94. In its collapsed position, such a cell will require but little space, and so might conveniently be housed within a nose cone 2 which is hollow or recessed, and which in one way or another is removable. It might be for example, frangible, and there could be means for bursting or breaking it when its removal is desired, or it might be held by bolts 20 which are explosive and which, when burst by an ignitable charge at 21, would enable the nose cone 2 to be jettisoned. The cell 1 is shown in Figure 1 in its collapsed condition and in Figure 2 in its inflated condition. In the latter condition it substantially blocks the entire air inlet passageway 98, and so prevents air entering at 91 from passing on to the compressor and so to the combustion chambers. The cell 1 would normally be of flexible material so that it will conform to the shape of the interior of the air inlet passageway. It might rest when inflated against the forward edges of the radial vanes 92.

Inflating means should be a gas under pressure which is inert or non-combustible. A tank 3 for containing such gas is supported in some suitable location and is connected to the inflating conduit 32 by either of two passages 30 or 31 containing valves 33 and 34, respectively. The valve 33 is a valve which is operable at will, as for example by a pull cord 35 from the pilot's station or similar convenient location, whereas the valve 34 is an inertia or impact-actuated valve that automatically opens upon impact or abrupt deceleration of the engine. Since the lines 30 and 31 are parallel, it follows that it is possible to inflate the cell 1 either automatically or manually, and it is immaterial if both such inflating means be actuated.

Since, of course, it is necessary to remove the nose cone 2 in order that the cell may expand freely, similar means are provided for actuating the cartridges 21 by which the nose cone is broken or jettisoned, or any other cone-removing means. Circuit wires 22 are shown leading to the elements 21, and two switches are provided, the switch 23 being a manually closed switch and the switch 24 an inertia or impact-actuated switch. It is desirable, if the nose cone is to be jettisoned manually, that the manual switch 23 be connected to the pull cord 35 for the manual valve 33, or to a common actuator, so that the two are actuated substantially simultaneously, or the nose cone slightly in advance of opening of the valve 33. If actuation is by impact, it is immaterial, of course, that the valve 24 and the switch 34 be connected.

It is also highly desirable that the fuel supply to the nozzle 96 be stopped at the same time. The fuel supply line 6 is shown as provided with a manually operated valve 60 and with an inertia or impact-actuated valve 61. Actuation of the manual valve 60 is by means of the pull cord 62 or similar means and this may be connected at 63 to the pilot's control 35 for the valve 33. This interconnection is typical of other interconnections referred to herein.

In order that the device be as small and light as possible, the supply of inflating gas in the supply tank 3 would ordinarily be not appreciably in excess of the amount required to fully inflate the cell 1. It is possible to provide some excess of inert gas, which excess if provided may be delivered into the intake end of the compressor section and so will find its way through the engine and assist in smothering any incipient fires, and also will assist in cooling the engine. For example, nozzles 4 and 40 are shown, each branched off the inflating line 32 and controlled either by restricted orifices or by the respective valves 41 and 42. The valve 41 may be manually operable and can be tied in with the other controls, directly or through delayed-action means, and the valve 42 then would be impact or inertia-actuated. Such valves, if need, would preferably incorporate pressure sensitive elements which will maintain the nozzle 4 or 40 closed, notwithstanding opening of their valves, until such time as the pressure has fully inflated the cell 1, and that in the tank 3 has dropped to a value that will open the valves 41 or 42. Alternatively, restricted orifices would need no controls. Neither is essential to the successful operation of the invention, broadly considered. A check valve, as indicated at 37, would desirably be employed intermediate the valves 41 and 42 and the cell 1 in order to avoid escape of pressure from the cell 1 after its inflation, through the nozzles 4 and 40, but an excess, if any, of inert gas, following inflation of the cell 1, would still be permitted to leak by way of nozzles 4 and 40 into the engine behind the inflated cell.

The cell would be out of the way during all normal operation. If a crash were seen to be imminent, the pilot could pull a single control and thereby effect actuation of the several manual valves (essentially, the valve 33, and any others provided, as at 41 and 60) and the jettisoning means at 21, or, if the pilot fails so to act, impact would effect actuation of these various devices. Thereupon, the nose cone 2 would be broken or jettisoned, the cell 1 would be inflated and would fill the air intake passageway 98 as in Figure 2, and so would block entrance of air to the compressor. The compressor might still be rotating, but it could not draw in more air to feed combustion or combustible vapor to ignite in the vicinity of the combustion chambers 95. Any residue of inert gases exiting from the nozzles 4 or 40 would be drawn by the whirling blades 94 of the compressor through the compressor section and past the combustion chambers, and there would serve to quench any fire that might have started and, in addition, will serve to cool parts.

I claim as my invention:

1. Fire protection mechanism for the air-breathing jet engine of an aircraft, such as include an air passageway leading from a front intake opening rearwardly to a combustion section, such mechanism comprising an inflatable and expansible cell, means for storing said cell in collapsed, uninflated condition ahead of the combustion section, a supply source of inert inflating gas under pressure, conduit means to deliver gas from said source to the cell, the cell being of a size and shape when inflated, and so located, as to block said air passageway, and means in said conduit means to control admission to the cell of the inflating gas.

2. Fire protection mechanism as in claim 1, wherein the engine includes a compressor section intermediate the air intake opening and the combustion section, the storing means for the inflatable cell being located in the air passageway ahead of the compressor section.

3. Fire protection means as in claim 1, wherein the control means includes an impact-sensitive valve means intermediate the cell and the supply source, openable by impact to deliver the gas to the cell automatically upon impact.

4. Fire protection means as in claim 1, wherein the control means includes a manually operable valve means intermediate the cell and the supply source, for delivering gas to the cell at will.

5. Fire protection means as in claim 4, including a manually operable fuel supply control valve, and an operating connection extending between and common to each of the fuel supply control valve and the inflating gas supply valve means, on the one hand, and a distant actuating element.

6. Fire protection means as in claim 1, including a recessed removable nose cone axially disposed within the air intake passageway, the uninflated cell being housed within its recess, and means to remove the nose cone when the cell is to be inflated.

7. Fire protection means as in claim 6, and impact-sensitive means operatively connected to said removing means to actuate the latter automatically upon impact.

8. Fire protection means as in claim 1, including a discharge nozzle connected to the gas supply source and directed towards the combustion section of the engine, behind the inflated position of the cell, and means controlling emission of gas through said nozzle.

9. Fire protection means as in claim 8, the means controlling gas supply to the nozzle including valve means and a control means for the same sensitive to low supply pressure to open the valve means automatically for discharge of any residue towards the combustion chamber, following inflation of the cell.

10. Fire protection mechanism for air-breathing jet engines, such as include an engine housing open at its forward end for intake of air through an air passageway, and having a combustion section at the rear end of said air passageway, discharging rearwardly, such mechanism comprising a recessed jettisonable nose cone axially disposed within the air passageway, an inflatable cell of a size and shape to substantially block the air passageway when inflated, but normally collapsed and stored within the recess of said nose cone, a supply source of noncombustible inflating gas under pressure, means to deliver from said source to said cell gas to inflate the latter, means to control such delivery, means to jettison said nose cone, and means to actuate substantially simultaneously said jettisoning means and said control means.

References Cited in the file of this patent

UNITED STATES PATENTS

| | | |
|---|---|---|
| 2,744,382 | Sokol et al. | May 8, 1956 |
| 2,763,426 | Erwin | Sept. 18, 1956 |

FOREIGN PATENTS

| | | |
|---|---|---|
| 73,686 | Denmark | Jan. 21, 1952 |